US00RE49532E

(19) United States
(12) Reissued Patent
Al-Khamis

(10) Patent Number: US RE49,532 E
(45) Date of Reissued Patent: May 16, 2023

(54) METHOD AND APPARATUS FOR STORING ENERGY

(71) Applicant: King Saud University, Riyadh (SA)

(72) Inventor: Mohammed Abdulaziz Al-Khamis, Riyadh (SA)

(73) Assignee: King Saud University

(21) Appl. No.: 14/461,239

(22) Filed: Aug. 15, 2014

Related U.S. Patent Documents

Reissue of:

(64) Patent No.: 8,358,020
Issued: Jan. 22, 2013
Appl. No.: 12/744,447
PCT Filed: Nov. 24, 2008
PCT No.: PCT/EP2008/009948
§ 371 (c)(1),
(2) Date: Jul. 8, 2010
PCT Pub. No.: WO2009/065619
PCT Pub. Date: May 28, 2009

(30) Foreign Application Priority Data

Nov. 24, 2007 (GC) ..... 9531/2007

(51) Int. Cl.
*F03G 3/00* (2006.01)

(52) U.S. Cl.
CPC ..... *F03G 3/00* (2013.01)

(58) Field of Classification Search
CPC ..... F03G 3/00; Y02E 10/725; Y02E 70/30
USPC ..... 291/1 R
See application file for complete search history.

(56) References Cited

U.S. PATENT DOCUMENTS 3,953,971 A * 5/1976 Parker ..... 60/641.6
5,873,249 A * 2/1999 Alkhamis ..... 60/639
6,009,707 A * 1/2000 Alkhamis ..... F03B 17/02 60/398
6,249,057 B1 * 6/2001 Lehet ..... F03B 17/02 290/1 R (Continued)

FOREIGN PATENT DOCUMENTS

CN 101392737 * 3/2009
CN 103010878 * 4/2013 ..... B66B 1/302
DE 100 37 678 A1 2/2002

(Continued)

OTHER PUBLICATIONS

Information Disclosure Statement transmittal letter (4 pages, including English language explanations of non-English references) filed Jul. 8, 2010 in U.S. Appl. No. 12/744,447, which issued as U.S. Pat. No. 8,358,020.

(Continued)

*Primary Examiner* — Peng Ke
(74) *Attorney, Agent, or Firm* — Haug Partners LLP

(57) ABSTRACT

An energy storing system, which includes a plurality of weights; a first storing unit and a second storing unit, wherein the first storing unit is arranged below the second storing unit and each of the storing units includes a guiding track on which weights can be placed and along which weights can be moved, wherein each of these guiding tracks includes a first portion and a second portion, wherein the second portion is arranged below the first portion; and a loading unit configured to lift at least one weight from the first storing unit to the second storing unit during a first period thereby converting electrical energy to potential energy.

22 Claims, 4 Drawing Sheets

(56) References Cited

U.S. PATENT DOCUMENTS

| | | | | | |
|---|---|---|---|---|---|
| 6,990,906 | B2 * | 1/2006 | Powell | ..... | B60L 13/04<br>104/281 |
| 7,854,119 | B2 * | 12/2010 | Strain | ..... | F03B 13/06<br>290/44 |

FOREIGN PATENT DOCUMENTS

| | | | | | |
|---|---|---|---|---|---|
| DE | 20 2004 011770 | U1 | | 9/2004 | |
| GB | 2 090 939 | A | | 7/1982 | |
| GB | 2 224 807 | A | | 5/1990 | |
| GB | 224 807 | A | | 5/1990 | |
| JP | H06147097 | | * | 5/1994 | ..... Y02E 60/16 |

OTHER PUBLICATIONS

International Search Report for corresponding PCT Application No. PCT/EP2008/009948 dated Mar. 17, 2009.

* cited by examiner

METHOD AND APPARATUS FOR STORING ENERGY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The invention relates to a method and apparatus for storing energy.

It is a common concern to all providers of electrical energy to match the demand for electricity with their ability to provide electricity. In the course of, for instance, a day, demand typically rises to a high level during certain peak times and falls to lower levels during off-peak times. To meet the peak time demand and make use of any surplus electricity which may be available during off-peak times, electricity providers aim to store surplus energy produced during off-peak times in order to supply this surplus energy during peak times. The source of energy can be either a power plant generating electricity at a more or less constant level or some form of intermittent energy source, such as a solar powered energy source or a wind powered energy source.

An example of such a system is discussed in U.S. Pat. No. 5,873,249. Therein, a system is provided for generating energy using the difference in elevation between a relatively high elevation and a relatively low elevation, the system comprising a weight; a lifting device for lifting the weight from the relatively low elevation to the relatively high elevation and for enabling lowering of the weight from the relatively high elevation to the relatively low elevation; a generator for producing electrical energy for consumption; means for converting energy produced by said lifting device during lowering of said weight into drive energy for driving said generator; an electric motor for driving said lifting device to provide lifting of said weight and for driving said generator; and an intermittently operating energy source for supplying electrical energy to the electric motor during operation of the energy source to drive the generator and to enable lifting of the weight by the lifting device whereby the weight can be lifted during operation of the energy source to provide potential energy for the system.

Thus, the source of potential energy provided by the weight in the raised position assists in evening out or making more uniform the overall energy that can be supplied. Said system, however, only refers to a single weight, which is being raised and lowered. This limits the flexibility and versatility of the system known in the prior art. While U.S. Pat. No. 5,873,249 also mentions the possibility to have more than one lifting device capable of lifting a respective weight, those embodiments show a high degree of redundancy in that e.g. with every lifting device separate conversion means and a separate generator are associated.

It is therefore an object of the present invention to provide a method and a system for storing energy showing improved flexibility and versatility and reduced redundancy.

An energy storing system according to the present invention comprises an energy storing system, comprising a plurality of weights, a first storing unit and a second storing unit, wherein the first storing unit is arranged below (i.e. at a lower elevation than) the second storing unit and each of the storing units comprises a guiding track on which weights can be placed and along which weights can be moved, wherein each of said guiding tracks comprises a first portion and a second portion, wherein each second portion is arranged below (i.e. at a lower elevation than) its corresponding first portion; and a loading unit configured to lift at least one weight from the first storing unit to the second storing unit during a first period thereby converting electrical energy to potential energy, said loading unit further configured to lower said at least one weight from the second storing unit to the first storing unit during a second period, thereby converting potential energy to electrical energy, wherein the loading unit is configured to collect a weight from the second portion of the first storing unit and to place said weight on the first portion of the second storing unit during the first period and to collect a weight from the second portion of the second storing unit and to place said weight on the first portion of the first storing unit during the second period.

The energy storing system according to the present invention provides for a flexible and scalable system due to the possibility to use a plurality of weights and to operate in a cyclical manner.

To allow each weight to move freely along the guiding track on which it is placed, each weight preferably comprises wheels. Those wheels are configured to allow said weight to move from the first, higher portion of said guiding track to the second, lower portion of said guiding track preferably by the action of gravity alone. Thus, a weight which was placed on the first portion of the second storing unit during the first period will move to the second portion of the second storing unit and be ready for collection at the beginning of the second period.

In a preferred embodiment, the loading mechanism comprises a loading stage having a guiding track configured to cooperate with the respective guiding track of any of the storing units to facilitate direct transfer of the weight between the loading stage and the respective guiding track.

In another preferred embodiment said energy storing system comprises a multitude of storing units arranged at different heights, whereby an even higher degree of versatility is possible.

In a preferred embodiment of the present invention, the number of weights transferred during both the first and the second period is equal, whereas the duration of the second period is different from the duration of the first period. Thus, it is possible to generate a higher/lower power level during the lowering of a particular total weight compared to the power level used during lifting of said total weight, wherein power is defined as converted energy per unit of time.

The invention also provides a method of producing electrical energy as described below.

A method according to the present invention comprises the steps of providing a plurality of weights; providing a first and a second storing unit, wherein the first storing unit is arranged below the second storing unit; lifting at least one weight from the lower storing unit to the upper storing unit during a first period thereby converting electrical energy to potential energy; and lowering said at least one weight from the upper storing unit to the lower storing unit during a second period, wherein the duration of the second period is different from the duration of the first period, thereby converting potential energy to electrical energy.

Preferably the second period is either shorter or longer than the first period so as to be able to provide a higher/lower power level during the second period in comparison to the power level used during the first period.

In a preferred embodiment, the first period is an off-peak electricity period whereas the second period is a peak electricity period.

Further details of the present invention will become clear from the detailed description and the accompanying figures, wherein:

FIG. 1 schematically shows an energy storing system according to the present invention;

Figure 1:
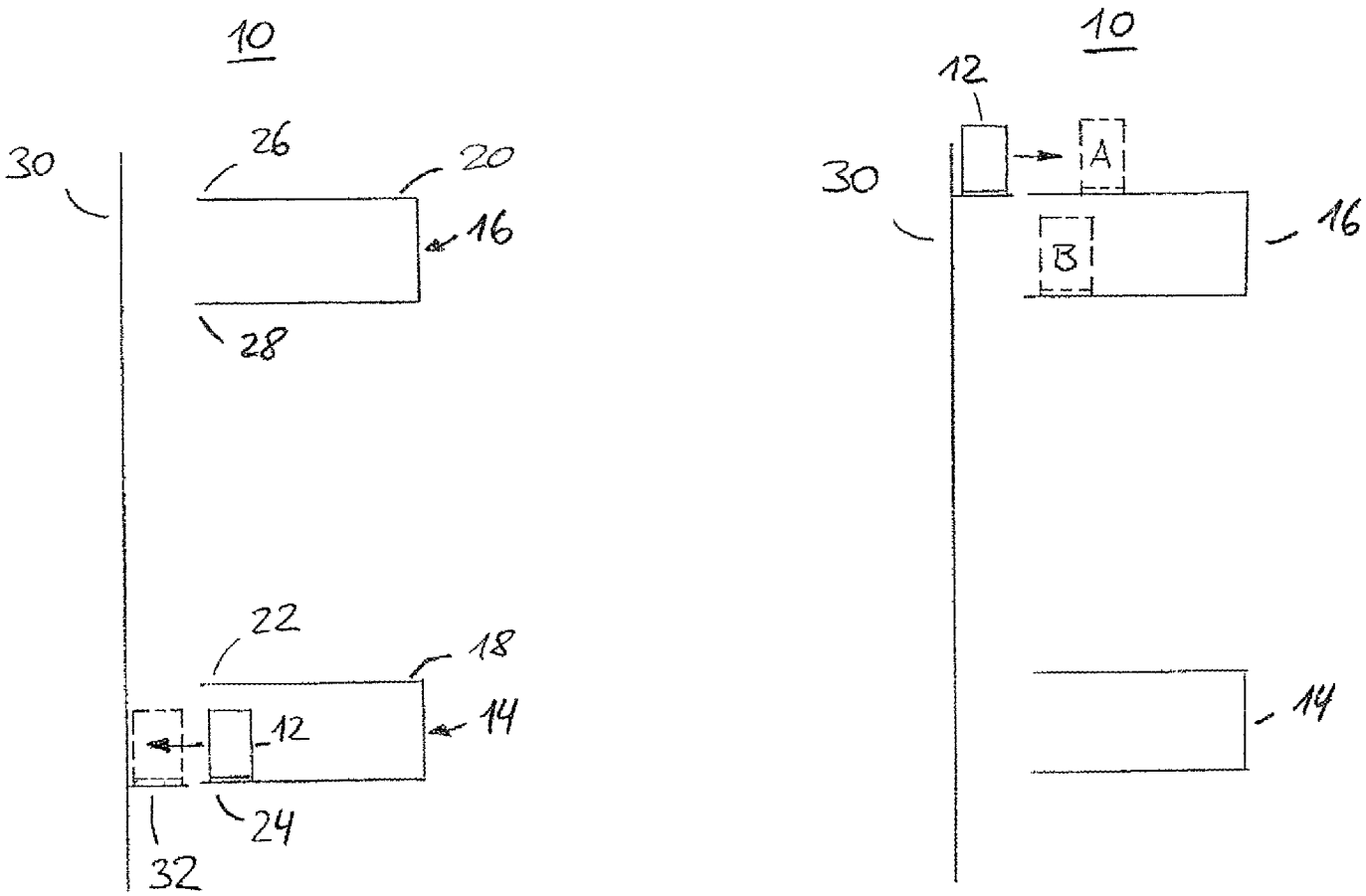
FIG. 1 is a schematic diagram showing an embodiment of the energy storing system 10 according to the present invention.

The energy storing system 10 comprises a plurality of weights 12, one of which being indicated in FIG. 1. The energy storing system 10 further comprises a first storing unit 14 and a second storing unit 16, wherein the first storing unit 14 is arranged below the second storing unit 16. Each of the storing units 14, 16 comprises a guiding track 18, 20 on which weights can be placed and along which weights can be moved. The first, lower guiding track 18 comprises a first portion 22 and a second portion 24, wherein the second portion 24 is arranged slightly below the first portion 22. Similarly, the second, upper guiding track 20 comprises a first portion 26 and a second portion 28, wherein the second portion 28 is arranged slightly below the first portion 26.

The energy storing system further comprises a loading unit 30 comprising a loading stage 32. As indicated in FIG. 1, said loading stage 32 can be moved up and down in between the first and second storing units 14, 16 in a predominantly vertical direction.

Shown in the left hand part of FIG. 1 is the transfer of a weight 12 from the lower portion 24 of the lower storing unit 14 on to the loading stage 32 (indicated by an arrow). Said weight 12 on loading stage 32 can then be lifted up to the second storing unit 16. To this end, the loading stage 32 is raised to and aligned with the first, upper portion 26 of the guiding track 20 of the second storing unit 16, as shown in the right hand part of FIG. 1. Subsequently, said weight 12 is transferred or placed on the guiding track 20. This latter operation is indicated by the arrow shown in the right hand part of FIG. 1.

Since the first portion 26 of guiding track 20 is arranged at a higher position/elevation relative to the second portion 28 thereof, weight 12 will move along the guiding track 20 from position "A" in the first portion 26 to position "B" in the second portion 28, since each weight 12 is fitted with wheels 13 allowing said weight 12 to move freely along each guiding track 18, 20. Once in position "B", said weight 12 is ready for collection to be transferred back to the first storing unit 14. More specifically, loading stage 32 can collect weight 12 from the second portion 28 of the upper guiding track 20, lower said weight 12 to the lower guiding track 18 and offload said weight 12 on to the first portion 22 of lower guiding track 18. Again, said weight 12 will move from the first, higher portion 22 to the second, lower portion 24 of guiding track 18. Thus, weight 12 is once more ready for collection to be lifted back up to the upper storing unit 16 and thus to start a new cycle.

The system shown in FIG. 1 can be used to lift weights 12 from the lower storing unit 14 to the upper storing unit 16 during a first peak electricity period and to lower those weights 12 from the upper storing unit 16 back to the lower storing unit 14 during a second, off-peak electricity period. By varying the duration of the second period relative to the duration of the first period, the released power can be controlled. For instance, if a particular weight 12 is lifted within a duration of 60 minutes and lowered within a duration of 30 minutes, twice the power will be available in the course of the second period.

Figure 2:
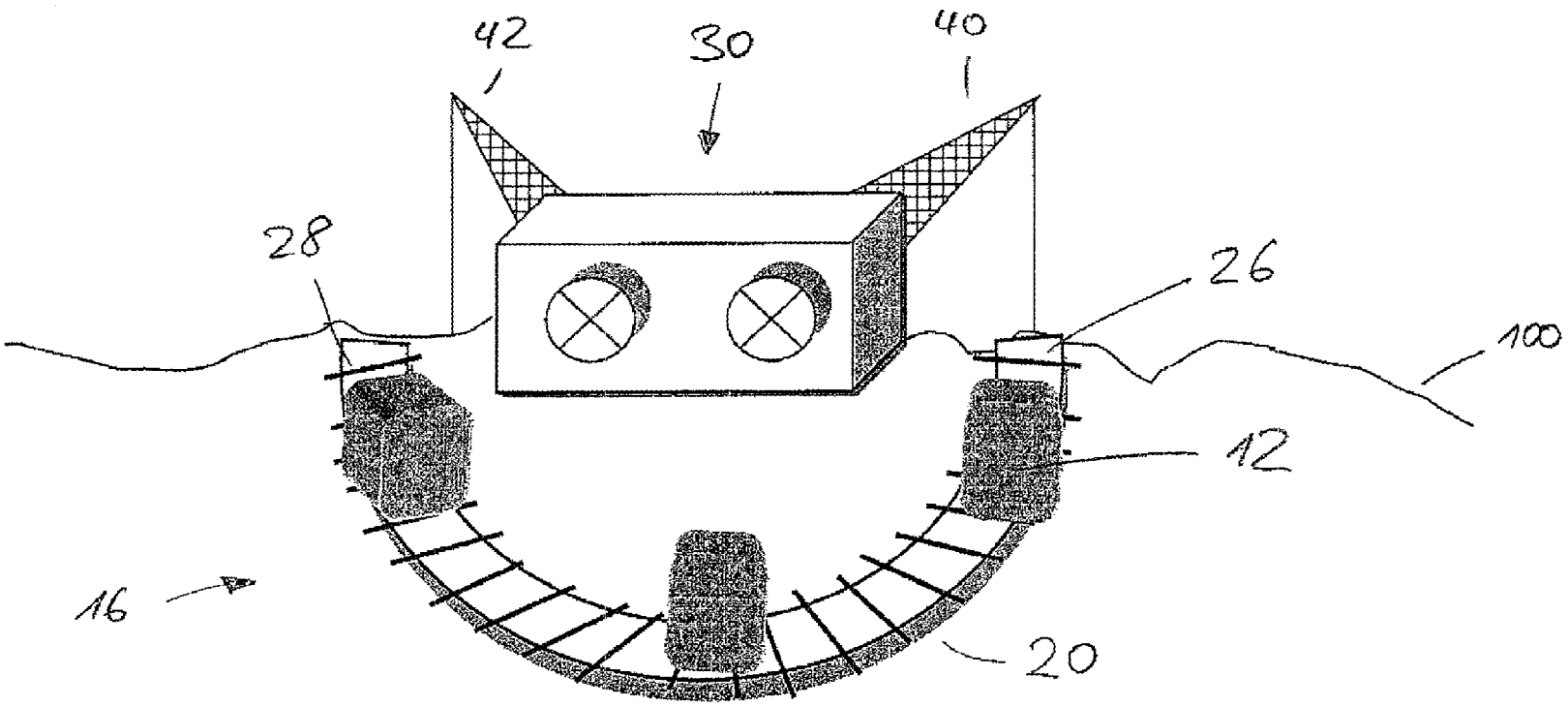
FIG. 2 shows a storing unit to be used in an energy storing system according to the present invention.

FIG. 2 shows an embodiment of the energy system, wherein the upper storing unit 16 is arranged near the top of a hill or mountain 100. Loading unit 30, which, in the embodiment shown in FIG. 2 comprises two lifters 40, 42, lifts weights 12 during a first period from the lower storing unit 14 (not shown in FIG. 2) up to the second storing unit 16, more particularly, to the first end 26 of guiding track 20 of the second, upper storing unit 16. From said first end 26 the weights 12 will move towards the second end 28, which is arranged at the slightly lower level in comparison to the first end 26. The loading unit 30 can then collect weights 12 from the second end 28 and lower those weights back to the first storing unit 14 during a second period.

Figure 3:
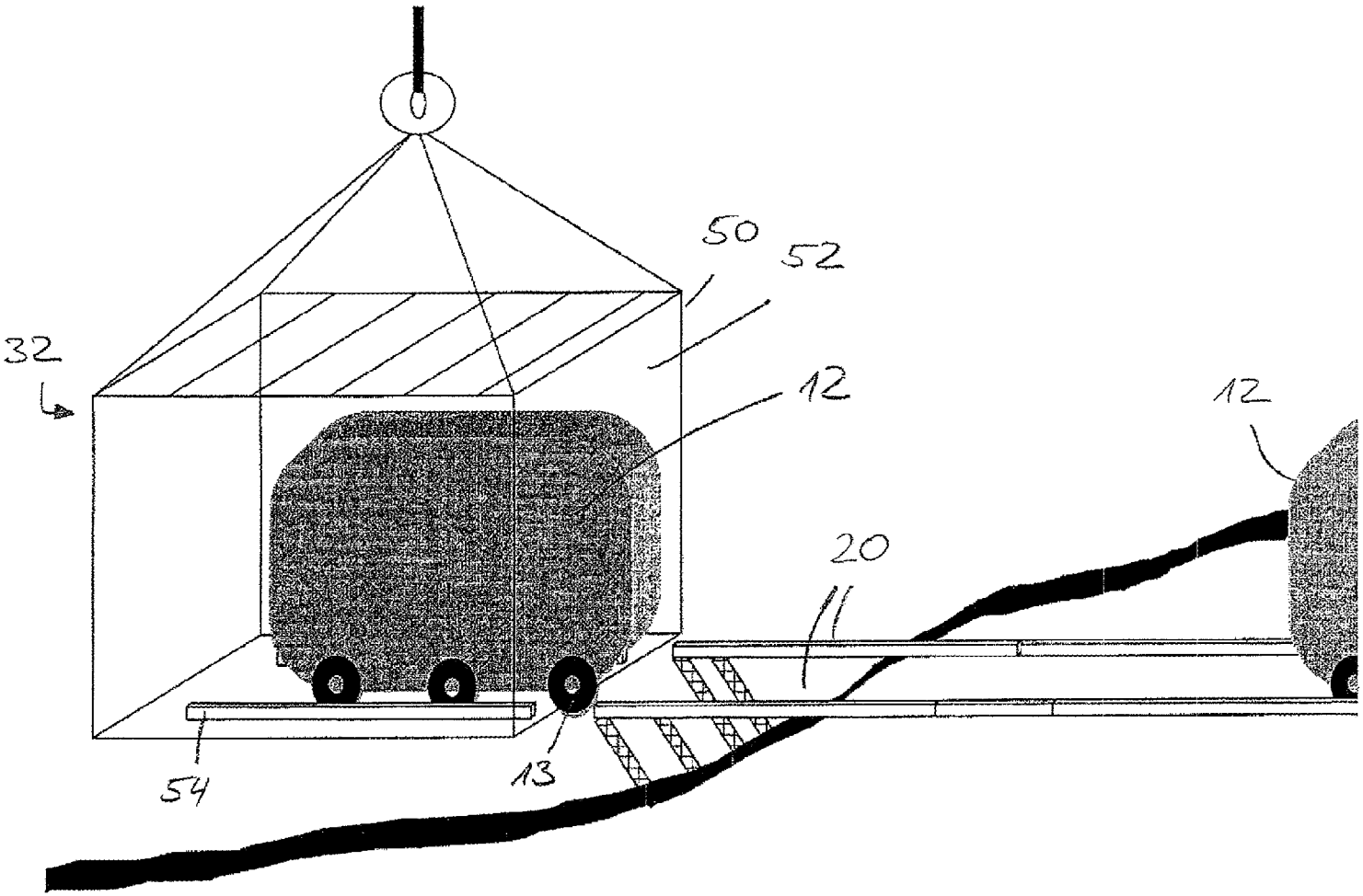
FIG. 3 shows details of the loading units to be used in the energy storing system according to the present invention.

FIG. 3 shows details of the loading stage 32. Loading stage 32 comprises a cabin 50 having an opening 52 facing the storing units 14, 16 during raising and lowering operations. A stage guiding track 54 is arranged at the bottom and on the inside of cabin 50. Said stage guiding track forms an extension of the guiding tracks 18, 20 of the lower and upper storing units 14, 16, respectively, when said cabin 50 is substantially aligned with either end of a guiding track 18, 20. In this aligned state, weight 12 having wheels 13 can be readily transferred between cabin 50 and the guiding tracks 18, 20.

Figure 4:
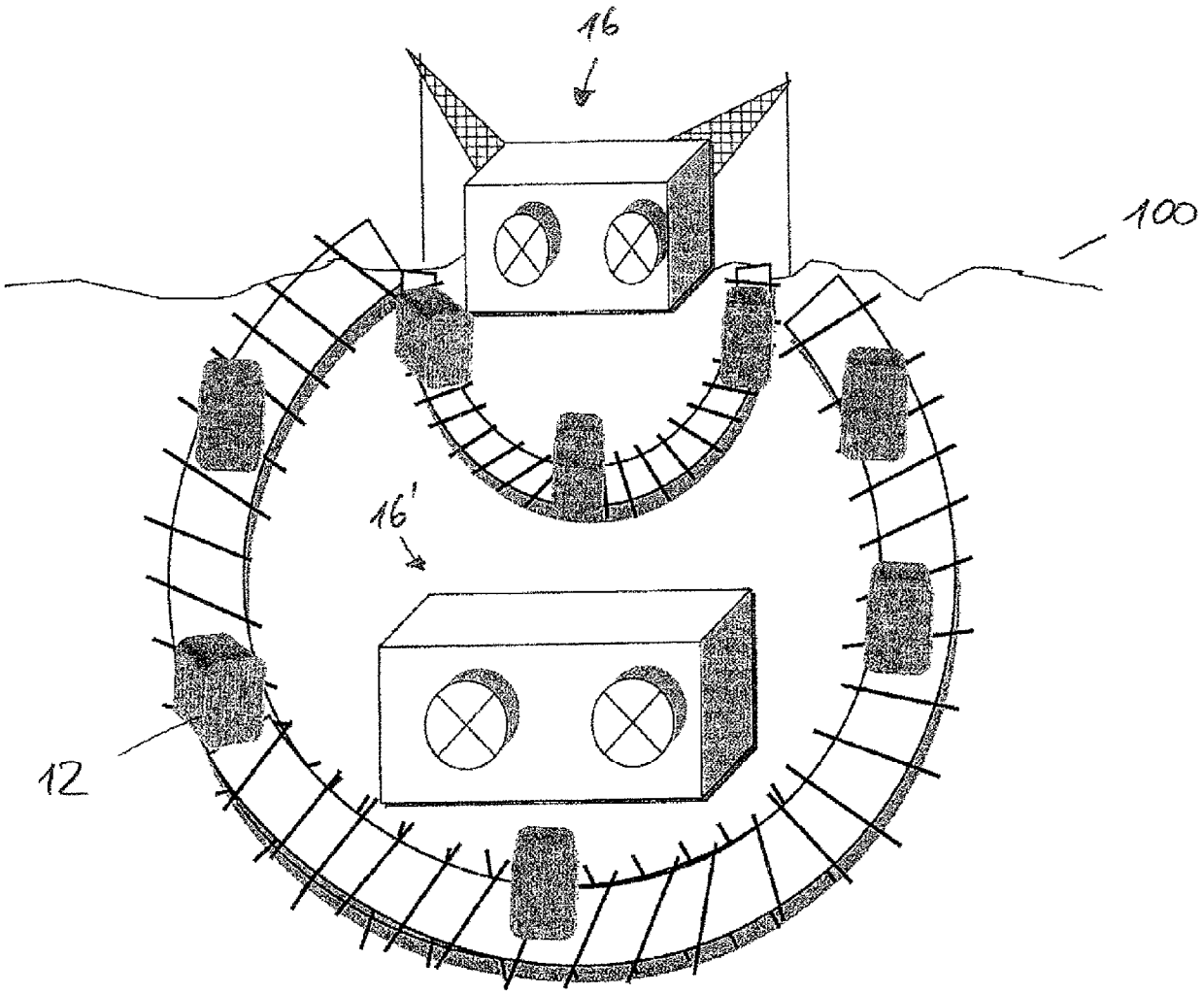
FIG. 4 shows two upper storing units to be used in an energy storing system according to the present invention.

FIG. 4 shows two upper storing units 16, 16' at the back of the edge of a mountain, wherein both guiding tracks reach the edge of the mountain 100. On the lifters there will be to every unit an axis on which in this case the axis of unit 16' will be higher than the axis of unit 16 also by raising the height of the lifters more units can be added on the back of the mountain's edge.

The invention also provides a method of producing electrical energy as described below.

A method according to the present invention comprises the steps of providing a plurality of weights; providing a first and a second storing unit, wherein the first storing unit is arranged below the second storing unit; lifting at least one weight from the lower storing unit to the upper storing unit during a first period thereby converting electrical energy to potential energy; and lowering said at least one weight from the upper storing unit to the lower storing unit during a second period, wherein the duration of the second period is different from the duration of the first period, thereby converting potential energy to electrical energy.

Preferably the second period is either shorter or longer than the first period so as to be able to provide a higher/lower power level during the second period in comparison to the power level used during the first period.

In a preferred embodiment, the first period is an off-peak electricity period whereas the second period is a peak electricity period.

Although the present invention has been described in relation to specific exemplary embodiments thereof, it will be understood by those skilled in the art that variations and modifications can be effected in these exemplary embodiments without departing from the scope of the invention.

The invention claimed is:

1. An energy storing system, comprising a plurality of weights (12);

a first storing unit (14) and a second storing unit (16), wherein the first storing unit (14) is arranged below the second storing unit (16) and each of the storing units (14, 16) comprises a guiding track (18, 20) on which *the plurality of* weights (12) can be placed *for storage* and along which weights (12) can be moved, wherein each of said guiding tracks (18, 20) comprises a first portion (22, 26) and a second portion (24, 28), wherein the second portion (24, 28) is arranged below the first portion (22, 26); and a loading unit (30) configured to *use an electric motor to* lift at least one weight (12) from the first storing unit (14) to the second storing unit (16) during a first period, thereby converting electrical energy to potential energy, said loading unit (30) further configured to lower at least one weight (12) from the second storing unit (16) to the first storing unit (14) during a second period *while the at least one weight (12) is coupled to a generator to generate electricity in response to the at least one weight being lowered*, thereby converting potential energy to electrical energy, wherein the loading unit (30) is configured to collect a weight (12) from the second portion (24) of the first storing unit (14) and to place said weight on the first portion (26) of the second storing unit (16) during the first period and to collect a weight (12) from the second portion (28) of the second storing unit (16) and to place said weight (12) on the first portion (22) of the first storing unit (14) during the second period*;*

*wherein for each of the first and second storing units, each of the weights placed on the first portion is collected from the second portion.*

2. The energy storing system according to claim 1, wherein each weight (12) comprises means such as wheels (13) configured to allow said weight to move freely along the guiding track (18, 20), on which said weight is placed, from the first portion (22, 26) to the second portion (24, 28) of said guiding track (18, 20).

3. The energy storing system according to claim 1, wherein the loading unit (30) comprises a loading stage (32) having a stage guiding track (54) configured to co-operate with the respective guiding track (18, 20) of any of the storing units (14, 16) to facilitate transfer of a weight between the loading stage (30) and the respective guiding track (18, 20).

4. The energy storing system according to claim 1, comprising a multitude of storing units arranged at different heights.

5. The energy storing system according to claim 1, wherein the duration of the second period is different from the duration of the first period.

[6. A method comprising the following steps providing a plurality of weights;

providing a first and a second storing unit, wherein the first storing unit is arranged below the second storing unit;

lifting at least one weight from the lower storing unit to the upper storing unit during a first period thereby converting electrical energy to potential energy; and lowering at least one weight from the upper storing unit to the lower storing unit during a second period, wherein the duration of the second period is different from the duration of the first period, thereby converting potential energy to electrical energy.]

[7. The method according to claim 6, wherein the second period is shorter than the first period.]

[8. The method according to claim 6, wherein the second period is longer than the first period.]

[9. The method according to claim 6, wherein the first period is an off-peak electricity period and the second period is a peak electricity period.]

*10. An energy storing system, comprising:*

*a loading unit;*

*a first storing unit at a first elevation;*

*a second storing unit at a second elevation that is higher than the first elevation, wherein the first and second storing units are each configured to store a plurality of masses offloaded thereto by the loading unit;*

*wherein the loading unit is configured to (i) collect a mass from the first storing unit, (ii) use a motor to lift the collected mass from the first storing unit to the second storing unit during a first lifting time period, thereby converting electrical energy to potential energy, and (iii) offload the lifted mass to the second storing unit, the loading unit further configured to (i) collect a mass from the second storing unit, (ii) lower the collected mass from the second storing unit to the first storing unit during a first lowering time period while the collected mass is coupled to a generator to generate electricity in response to the collected mass being lowered, thereby converting potential energy to electrical energy, and (iii) offload the lowered mass to the first storing unit, wherein the average released power level provided by lowering of a mass of a particular weight from the second storing unit to the first storing unit during the first lowering time period is controlled by varying the duration of the second period relative to the duration of the first period such that the average released power level is capable of being greater than and capable of being lower than the average power level used for lifting of a mass of said particular weight from the first storing unit to the second storing unit during the first lifting time period;*

*wherein each of the storing units comprises a track along which a plurality of the masses offloaded to the storing unit can be stored, wherein the track of each of the storing units extends between a first portion and a second portion of the respective storing unit, the first portion being at an elevation higher than the second portion; and*

*wherein the loading unit is configured (i) to collect the mass from the second portion of the first storing unit and to offload the mass onto the first portion of the second storing unit, and (ii) to collect the mass from the second portion of the second storing unit and to offload the mass onto the first portion of the first storing unit, wherein for each of the first and second storing units each of the masses offloaded onto the first portion freely moves by action of gravity along the respective track to the second portion.*

*11. The energy storage system according to claim 10, wherein the duration of the first lowering time period is capable of being varied relative to the duration of the first lifting time period.*

*12. The energy storing system according to claim 10, wherein each mass comprises wheels configured to facilitate the mass moving freely by action of gravity along the track onto which the mass is offloaded.*

*13. The energy storing system according to claim 10, wherein the loading unit comprises a loading stage having a stage guiding track configured to cooperate with the*

*respective track of the storing units to facilitate transfer of a mass between the loading stage and the respective track when offloading and collecting the mass.*

*14. The energy storing system according to claim 10, wherein the second storing unit comprises a plurality of tracks.*

*15. A method for converting energy in an energy storage system that comprises a plurality of masses, a lower storing unit at a first elevation and an upper storing unit at a second elevation, wherein the first elevation is lower than the second elevation, the method comprising:*

*(a) during an off-peak electricity time period, transferring a plurality of the masses from the lower storing unit to the upper storing unit, each of the masses being transferred by:*

*collecting the mass from the lower storing unit, the mass having a corresponding given weight;*

*using an electric motor to move the mass from the first elevation to the second elevation during a corresponding first time period, thereby converting electrical energy to potential energy; and*

*offloading the mass to the upper storing unit;*

*(b) during another time period, following the off-peak electricity period, transferring a plurality of the masses from the upper storing unit to the lower storing unit, each of the masses being transferred by:*

*collecting the mass from the upper storing unit, the mass having a corresponding given weight;*

*moving the mass from the second elevation to the first elevation during a corresponding second time period while the mass is coupled to a generator to generate electricity in response to the collected mass being lowered, thereby converting potential energy to electrical energy; and*

*offloading the mass to the lower storing unit;*

*wherein the average released power level provided by lowering of a given one of the masses of a particular weight from the upper storing unit to the lower storing unit during the second time period is controlled by varying the duration of lowering the particular weight during the second period relative to the duration of lifting said particular weight during the first period such that the average released power level is capable of being greater than and capable of being lower than the average power level used for lifting of a given one of the masses of the same particular weight from the lower storing unit to the upper storing unit during the first time period;*

*wherein each of the storing units comprises a track along which a plurality of the masses offloaded to the storing unit can be stored, wherein the track of each of the storing units extends between a first portion and a second portion of the respective storing unit, the first portion being at an elevation higher than the second portion; and*

*wherein (i) during the off-peak electricity time period, said collecting comprises collecting the mass from the second portion of the lower storing unit, and said offloading comprises offloading the mass onto the first portion of the upper storing unit, and (ii) during said another time period, said collecting comprises collecting the mass from the second portion of the upper storing unit, and said offloading comprises offloading the mass onto the first portion of the lower storing unit, wherein for each of the upper and lower storing units each of the masses offloaded onto the first portion freely moves by action of gravity along the respective track to the second portion.*

*16. The method according to claim 15, wherein said another time period is a peak electricity period.*

*17. The method according to claim 15, wherein the second time period corresponding to a given one of the masses having a particular weight is capable of being varied relative to the first time period corresponding to a given one of the masses having the same particular weight.*

*18. The method according to claim 15, wherein the second time period corresponding to a given one of the masses having a particular weight is less than the first time period corresponding to a given one of the masses having the same particular weight.*

*19. The method according to claim 15, wherein the upper storing unit comprises a plurality of tracks.*

*20. A method for converting energy in an energy storage system that comprises a plurality of masses, a lower storing unit at a first elevation and an upper storing unit at a second elevation, wherein the first elevation is lower than the second elevation, and wherein the lower and upper storing units each comprise a guiding mechanism between a first portion and a second portion of the respective storing unit, the first portion being at an elevation higher than the second portion, the method comprising:*

*(a) during an off-peak electricity time period, transferring a plurality of the masses from the lower storing unit to the upper storing unit, each of the masses being transferred by:*

*collecting the mass from the second portion of the lower storing unit;*

*using an electric motor to move the mass from the first elevation to the second elevation, thereby converting electrical energy to potential energy; and*

*offloading the mass to the first portion of the upper storing unit for storage on the guiding mechanism of the upper storing unit;*

*(b) during another time period, following the off-peak electricity period, transferring a plurality of the masses from the upper storing unit to the lower storing unit, each of the masses being transferred by:*

*collecting the mass from the second portion of the upper storing unit;*

*moving the mass from the second elevation to the first elevation while the mass is coupled to a generator to generate electricity in response to the collected mass being lowered, thereby converting potential energy to electrical energy; and*

*offloading the mass to the first portion of the lower storing unit; and*

*wherein for each of the upper and lower storing units, each of the masses offloaded onto the first portion moves along the guiding mechanism to the second portion such that each of the masses offloaded to the first portion is collected from the second portion.*

*21. The method according to claim 20, wherein each of the masses offloaded onto the first portion freely moves by action of gravity along the guiding mechanism to the second portion.*

*22. The method according to claim 20, wherein each of the storing units comprises a track along which a plurality of the masses offloaded to the storing unit can be stored.*

*23. The method according to claim 20, wherein the upper storing unit comprises a plurality of tracks.*

*24. The method according to claim 20, wherein the duration of a first time period for moving a given one of the*

*masses having a particular weight from the first elevation to the second elevation is capable of being different from the duration of a second time period for moving a given one of the masses having the same said particular weight from the second elevation to the first elevation.*

*25. The method according to claim 24, wherein the second time period is capable of being varied relative to the first time period.*

*26. The method according to claim 24, wherein the second time period is less than the first time period.*

* * * * *